April 27, 1948.  H. R. ALLEY ET AL  2,440,456
APPARATUS FOR PURIFYING METALLIC MERCURY
Filed Dec. 9, 1942
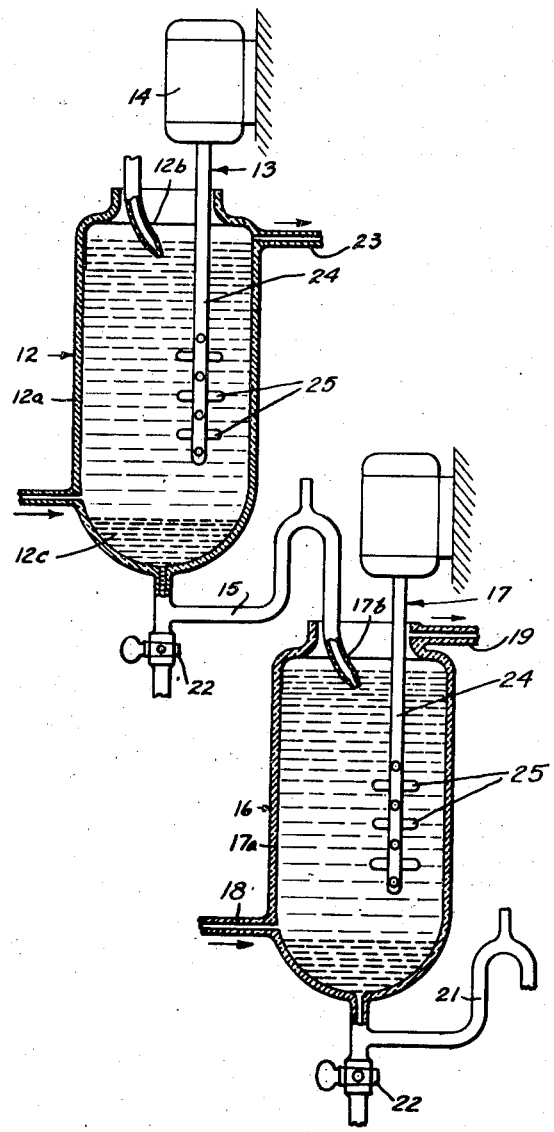
Inventors
Harold R. Alley
Benjamin F. Freeberg
BY
Parker, Carlson, Pigeon & Hubbard.
Attorneys.

Patented Apr. 27, 1948

2,440,456

UNITED STATES PATENT OFFICE 2,440,456

APPARATUS FOR PURIFYING METALLIC MERCURY

Harold R. Alley, Northbrook, and Benjamin F. Freeberg, Chicago, Ill.

Application December 9, 1942, Serial No. 468,395

1 Claim. (Cl. 266—34)

The invention relates to the purification of mercury and has for its general aim the provision of a new and improved apparatus for purifying metallic mercury that has become contaminated.

Other objects and advantages will become apparent in the following description and from the accompanying drawings in which the figure is a view illustrating somewhat diagrammatically a preferred form of washing apparatus.

While the invention is susceptible of various modifications and alternative constructions, we have shown in the drawings and will herein describe in detail, the preferred embodiment, but it is to be understood that we do not thereby intend to limit the invention to the specific form disclosed, but intend to cover all modifications and alternative constructions falling within the spirit and scope of the invention as expressed in the appended claim.

Since the present invention has wide spread utility in the purification of mercury that has become contaminated while in industrial use, it will be considered primarily in this connection.

Mercury in such industrial uses as in mercury-arc rectifiers, manometers, electrical contacts and the like, becomes increasingly inefficient in performing its intended function as it becomes contaminated, yet the affinity for mercury of many contaminants of widely different characteristics makes it extremely difficult, if not impossible, to maintain the mercury in a pure, efficient condition. It is therefore necessary that the mercury be purified from time to time to restore its efficiency. Contaminated mercury is difficult to purify as will be understood when it is considered that the contaminants commonly encountered may include such extraneous material as copper, iron, floor dirt, grease, oil, solder, water, and mercury oxides. Moreover, such contaminants may be present as a coating or film, as an amalgam or as a material in solution in the mercury.

According to the present process a body of contaminated mercury to be purified is subjected to a series of purification steps, each of which is effective to remove most, if not all of certain classes of impurities or contaminants, and which steps generally condition the impure mercury for the more efficient treatment thereof in a subsequent step. The present invention deals specifically with the means for carrying out one of these steps, namely, washing a body of filtered mercury successively in a weak acid wash and then in a water wash to remove metals in solution in the mercury.

duced to a state of substantially colloidal fineness to insure rapid and complete removal of the acid and water soluble materials. Thus, the mercury passes to the first of two washing devices which are preferably connected in series. In the first or upper washing device, indicated at 12, the mercury is given an acid wash preferably with dilute (on the order of 10%) nitric acid. The washer comprises a suitable container 12$^a$ into the upper portion of which the mercury is introduced in a fine stream thru a restricted orifice 12$^b$. A mechanical stirrer 13 within the container 12$^a$ is arranged to be driven at a high rate of speed by a motor 14. This high speed action on the incoming fine stream of mercury breaks it into extremely fine particles substantially, if not actually of colloidal fineness. The stirrer 13 also causes the mercury particles to travel through a long spiral path downwardly toward a collection point at the bottom of the container 12$^a$. At the collection point the particles recombine into one mass.

The mechanical beating action of the stirrer 13 tends to break up any amalgams in the mercury body and the fineness of the particles as well as the long path through which they travel to the bottom of the container 12$^a$ enables the nitric acid to remove such mercury soluble metals as zinc, tin, lead, and copper from the mercury. The conversion of these mercury soluble metals into their salts is, of course, accompanied to some extent by the similar conversion of mercury, but the mercury thus lost may be recovered in a subsequent step in the process.

Preferably the acid wash container 12$^a$ has a bottom outlet communicating with a conduit 15 having a return bend providing a trap for maintaining a small quantity of mercury 12$^c$ in the bottom of the container. The conduit leads to the second or water washing device 16, and is arranged to discharge a fine stream of mercury thereinto through a nozzle 17$^b$. The water washing device is generally like the first and also includes a motor driven stirrer 17 for again breaking the fine stream of mercury into extremely small particles in a bath of wash water which preferably flows continuously through the container 17$^a$ from a bottom intake pipe 18 to a top outlet pipe 19. The fine particles of mercury are adequately washed as they travel to the bottom of the container 17$^a$, thus removing water soluble metal salts and traces of acid from the mercury.

The mercury after the water wash is withdrawn from the container 17$^a$ through a bottom The bottom outlets may be valve controlled, as at 22, to permit the liquids therein to be withdrawn as desired. In the case of the acid wash device this is used to remove the spent acid. The acid container 12ª may have a top outlet 23 for connection with an exhaust pump to withdraw acid fumes. In the water container 17ª the bottom water inlet 18 and a top outlet 19 produce a continuous flow of water, and in this connection it will be noted that the outlet is far from the stirrer to minimize the loss of mercury with the water stream.

The stirring members, in this instance, comprise motor driven rods 24 having radially projecting stems 25. The members are of stainless steel or other suitable material which is acid and water resistant, and has no affinity for mercury. The motors are adapted to drive the stirrers at high rates of speed. It is preferred that the driving motors be arranged for variable control, since the proper operating rate may vary widely, as for example between 2400 R. P. M. and 4000 R. P. M. depending on the purity of the mercury, the strength of the acid wash, the rate of mercury flow, and the desired fineness of the particles.

We claim as our invention:

A washing device for use in the purifying of mercury comprising, in combination, an acid wash container adapted to contain a body of acid wash and having a mercury collection space at the bottom and a mercury outlet opening from said space, a vertical rotary stirrer projecting into the top of said container and being located above said collection space, a mercury supply conduit projecting into the upper end of said container and having the discharge orifice positioned to direct a stream of mercury into the top of said container and toward said stirrer located therein, a water wash container adapted to contain water wash and having a mercury collection space at the bottom and a mercury outlet opening from said last mentioned space, a vertical rotary stirrer projecting into the top of said water wash container and located above said last mentioned collection space, a conduit connected to said first mercury outlet and projecting into the top of said water wash container and having a discharge orifice for delivering a stream of mercury into the top of said water wash container and toward the stirrer therein, said water wash container being located below said acid wash container and said last mentioned conduit having a return bend providing a trap for maintaining a small quantity of mercury in said first collection space, each stirrer in cooperation with the associated orifice being adapted to finely comminute the stream of mercury directed thereto and to cause the dispersed particles of mercury to move downwardly through a spiral path to the associated collection space.

HAROLD R. ALLEY.
BENJAMIN F. FREEBERG.

REFERENCES CITED

The following references are of record in the file of this patent:

UNITED STATES PATENTS

| Number | Name | Date |
|---|---|---|
| 659,485 | Maigner | Oct. 9, 1900 |
| 1,718,103 | Baxter | June 18, 1929 |
| 2,032,602 | Stearns | Mar. 3, 1936 |
| 2,275,266 | Meyer | Mar. 3, 1942 |

OTHER REFERENCES

Quantitative Analysis by Electrolysis, Cassen and Hall, pages 127 and 128.

The Industrial Chemist, July 1929, pages 289-292, and Feb. 1932, pages 63 and 64.